April 18, 1967     H. H. YOUSOUFIAN     3,314,354
INDUCTION UNIT FOR AIR CONDITIONING SYSTEM
Filed Sept. 9, 1964
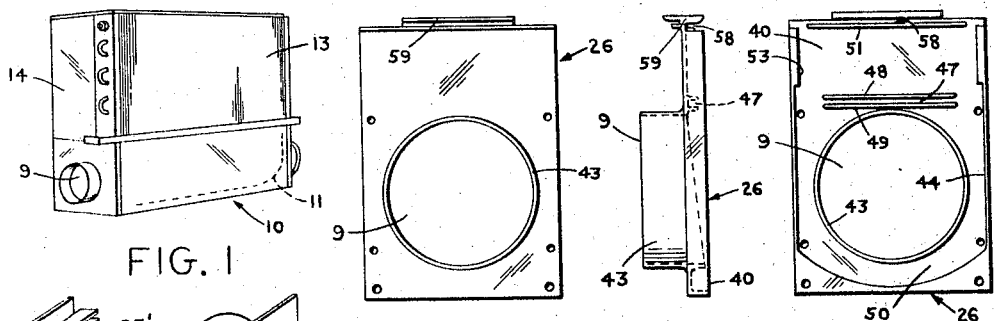
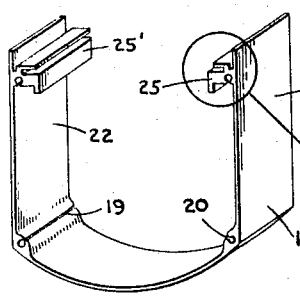
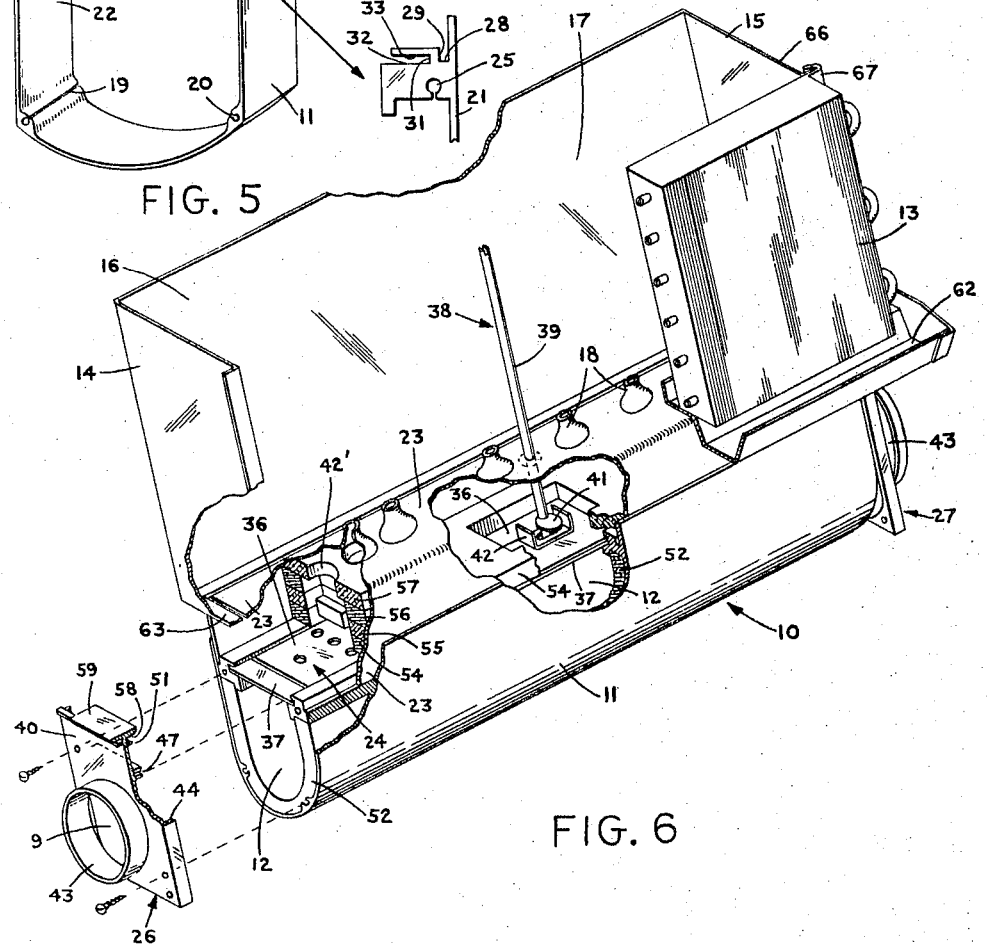
HRANT H. YOUSOUFIAN
INVENTOR.

United States Patent Office 3,314,354
Patented Apr. 18, 1967

3,314,354
INDUCTION UNIT FOR AIR CONDITIONING SYSTEM
Hrant H. Yousoufian, Verona, N.J., assignor to Worthington Corporation, Harrison, N.J., a corporation of Delaware
Filed Sept. 9, 1964, Ser. No. 395,154
6 Claims. (Cl. 98—38)

This invention relates to an induction unit for use in an air conditioning system wherein a first stream of treated or conditioned air induces a second stream of untreated air to mix into a single stream, prior to introduction of the resulting mixed stream to an area to be conditioned.

Induction units of the type contemplated are well known. Normally, in an air conditioning system adapted to present day structures, a plurality of such induction units are disposed at various parts of the building to deliver a controlled flow of conditioned air to a particular room or area in accordance with cooling requirements dictated by the conditions in the room. The unit is connected to a source of conditioned air conveyed by a pipe or conduit from a central air conditioning system. Conditioned air is then discharged through constricted nozzles to induce and mix with secondary air prior to introduction of the mixture into a room.

The induction unit is provided with an opening for admitting a stream of secondary air drawn directly from the room being conditioned and induced into a mixing chamber by the low pressure established in the latter as a result of high velocity primary air jets. A heat exchanger is positioned directly in the path of the secondary air stream for regulating the temperature of secondary air entering the unit. This heat exchanger is connected to a source of heat exchange fluid such as hot or cold water which is metered through the heat exchange coil to regulate the temperature of secondary air passing into the unit mixing chamber. The primary air, supplied to the unit, is in sufficient amount to meet the ventilation requirements and to provide the induction effect on secondary air to meet the thermal loads in the room.

Induction units of this type are normally fabricated of sheet metal and specifically designed to meet particular capacities and special requirements of a room or area to be conditioned. The unit is so formed to define a plenum chamber which is connected to and receives the flow of conditioned air from the conditioned air source. Valve means disposed within the unit is adjustable to regulate flow of primary air passing from the plenum chamber and into constricted discharge nozzles.

Such induction units tend to become mechanically intricate in structure and costly to manufacture. Since the cooling requirements of each room in a structure may differ from cooling requirements in other rooms, respective induction units used at various locations are normally of a varying capacity thereby accommodating a greater or lesser number of primary air discharge nozzles, as well as secondary air coil face area.

One purpose of the present invention is to simplify the structure or the complexity of induction units of the type described to reduce the cost of manufacture. The disclosed structure permits rapid assembly of the unit to specific operating requirements, and in accordance with the load requirements of the room or area to be cooled.

The induction unit hereinafter described, includes a compact assembly of members in such arrangement to utilize a minimum number of fasteners, thereby greatly decreasing the assembly time normally required for similar units. The structure in brief provides a rigid casing member including inlet means for primary air and a plurality of outlets for delivering high velocity streams or jets of said primary air. End covers carried on opposed ends of the rigid casing and fastened to the latter, serve to position other internal members in place to define the respective passages and control means for primary air passing through the system.

It is therefore, an object of the invention to provide a simple, unified induction unit for an air conditioning system which utilizes primary conditioned air to induce secondary or unconditioned air for mixing therewith.

A further object is to provide an induction unit for an air conditioning system which lends itself to ease of manufacture and assembly.

A still further object of the invention is to provide a unit of the type described including a casing holding primary air and formed of a substantially rigid member having inlet means and outlet means, and valve means therein to regulate passage of air through said unit for introduction to a room to be conditioned.

A still further object of the invention is to provide a structure adaptable to a simple means for sealing seams, so as to minimize if not eliminate air leaks to which such high pressure induction units are prone.

These and other objects of the invention not specifically delineated will become clear to those skilled in the art from the following description of the apparatus made in conjunction with the accompanying drawings in which FIGURE 1 is an isometric view of an induction unit of the type described.

FIGURE 2 is a front view on enlarged scale of an end plate shown in FIGURE 1.

FIGURE 3 is a side view of the end plate shown in FIGURE 2.

FIGURE 4 is a rear view of the end plate shown in FIGURE 2.

FIGURE 5 is a segmentary isometric view in cross section of the casing member shown in FIGURE 6.

FIGURE 6 is a view on an enlarged scale in partial cross section, of the induction unit of FIGURE 1, with parts removed to illustrate internal members.

Referring to FIGURES 1 and 6, one form of the novel induction unit is generally designated 10 and includes basically, an elongated outer shell or casing 11 forming an enclosure. A plenum chamber 12 extends longitudinally of the enclosure and is provided with at least one opening 9 adapted for connection to a duct or other means carrying a pressurized stream of primary conditioned air. Where a plurality of induction units are to be serially connected in a system, openings at opposed ends of the plenum are connected by suitable duct means to pass primary air from one unit to the next. Where, however, a unit is at the end of the system, the end of the plenum remote from the inlet opening is sealed.

Heat exchanger means 13 is associated with the primary air plenum and forms together with backwall 16, sidewalls 14 and 15 extending upwardly from casing 11, a mixing chamber 17 having a discharge outlet at the upper end of said chamber 17 remote from the primary air plenum 12.

Conditioned primary air is supplied to plenum 12 from a source, and directed to mixing chamber 17 through constricted nozzles or openings 18 so formed and arranged with respect to heat exchange 13 to induce secondary or room air through the latter and into the mixing chamber 17.

For efficient system operation, a desired proportion of primary air to secondary air carried through the unit is maintained at a ratio of between about 1 to 4 and 1 to 8. Primary air is supplied from the central source at a predetermined condition of temperature and humidity and at a substantially constant rate of flow. To meet cooling load conditions in a particular room or area, the characteristics of secondary room air admitted into mixing chamber 17 is adjusted or tempered by varying the flow of heat transfer medium to the heat exchange means 13. Thus, by controlling the flow of heat transfer fluid through heat exchanged tubes, individual control of each induction unit is possible.

In the present invention, conditioned primary air is directed from plenum 12 to mixing chamber 17 into which it is injected through nozzles 18. Between plenum 12 and discharge nozzles 18, the rate of flow of primary air is regulated by suitable dampering elements 36 and 37 and forming valve assembly 24. Noise generated by high velocity air streams is attenuated by means of sound absorbing passages disposed and upstream of the nozzles.

Referring to FIGURES 5 and 6, casing 11 is formed of an elongated member having generally parallel walls 21 and 22 terminating at opposed end surfaces. A nozzle plate 23 is carried longitudinally of casing 11 and includes a plurality of constricted openings or nozzles 18 which direct air streams upwardly in high velocity jets thereby forming a low pressure area adjacent the surface of heat exchanger 13. The pressure area created by discharging high velocity jets induces secondary room air through openings in heat exchange coil 13 and into contact with primary air in mixing chamber 17.

End covers 26 and 27 disposed at opposed ends of casing 11, are formed with channels at the inner face thereof adapted to receive and register with corresponding end surfaces of the respective casing 11, nozzle plate 23, and valve assembly 24. Thus, when properly engaged, end covers 26 and 27 will function to fixedly position each of said elongated members relative to each other in the assembly.

Referring to FIGURE 5, an embodiment of casing 11 is formed of an elongated metallic channel-like member having one open side defined by parallel walls 21 and 22. Casing 11 may be fabricated of separate wall members, welded or otherwise formed into the shown configuration. However, it is economically desirable to form the casing of a continuous metal extrusion as shown, with a curved lower surface connected to parallel upwardly extending sidewalls. Tracks 25 and 25' are carried on oppositely positioned walls 21 and 22 and extend parallel to casing 11.

Track 25 as shown in FIGURES 5 and 6, includes a vertical riser 29 formed adjacent wall 21 of the casing 11, thereby defining a groove 28. A second groove or channel 31 formed on the inner side of track 25 includes parallel extending side faces 32 and 33 defining an opening disposed in a generally horizontal plane. A third opening 34 formed in track 25 opens downwardly to receive and position a layer of fiberglass or other similar insulation 52 carried in the casing 11 as a sound absorbing medium.

When, casing 11 is fabricated of a metallic extrusion, such metal following standard practice, may be relatively soft as aluminum or a similar alloy composition which lends itself to the extrusion process.

Toward the lower end of the oppositely disposed walls 21 and 22 in casing 11, longitudinal raised beads 19 and 20 formed at the wall surfaces, provides means for threadably inserting a self tapping or similar screw into the casing to position end cover plates.

Nozzle plate 23 includes a flat plate member having downwardly depending parallel sides. Said sides are spaced sufficiently apart to be received in corresponding grooves formed in track means 25 and 25', thus providing an upper closure to the chamber formed to the casing 11. Nozzle plate 23 includes the openings or nozzles 18 spaced longitudinally along the plate and extending therethrough. The nozzles as herein mentioned, are constricted to provide primary air issuing therethrough with a relatively high exit velocity to establish the desired reduced pressure within mixing chamber 17. Nozzle plate 23 as in the instance of casing 11, may be fabricated of an aluminum extrusion or other relatively formable metal.

Referring to FIGURE 6, valve assembly 24 is slidably carried in casing 11, and includes a pair of thin perforated valve plates 36 and 37. Each of said plates is provided with plurality of openings passing therethrough and disposed in substantial alignment with corresponding openings in the other of said plates. Lower valve plate 37 is carried within parallel grooves 31 formed in tracks 25 and 25', and so positioned within the casing 11, to be substantially stationary. Upper valve plate 36 is slideable along the surface of valve plate 37 and also confined to grooves 31, such that corresponding openings in the respective plates may be adjusted to an overlapping position thereby altering the cross-sectional area therethrough to provide a desired air flow rate. Upper valve plate 36 is of a lesser length than the lower valve plate 37 to permit longitudinal adjustment of the former.

Valve actuating assembly 38 includes an elongated actuating valve stem 39 having an eccentric cam or arm 41 protruding from the lower end thereof, which stem 39 passes through upper valve plate 36 and is rotatably received in an opening formed in the lower stationary valve plate 37. A socket 42 or similar receptive means carried on plate 36 receives cam 41 in such manner to contact surfaces of the latter as said actuating stem 39 is rotated, thereby adjusting the relative positions of upper and lower plates 36 and 37 to vary the overall opening of passages communicated with chamber 12.

Individual attenuating passage 42' formed between plenum chamber 12 and nozzles 18, includes a circuitous opening formed of sound absorbing material and so shaped to define separate passages communicating with respective valve plate openings with corresponding nozzles 18 in plate 23. Said attenuating passage 42' may be shown in FIGURE 6, to be formed of a plurality of built up layers of a resilient, sound absorbing material such as fibreglass, polyurethane or the like.

As shown in FIGURE 6, with the pliable attenuating members sufficiently compressed, there are defined a plurality of upwardly extending attenuating passages, each of which terminated at nozzles 18.

The upper end of valve actuating stem 39 may be recessed or otherwise adapted to receive an actuating handle. Thus, at the initial installation of the induction unit, valve assembly 24 is set to a predetermined position for the purpose of balancing air flow through the induction unit. This balancing will depend, in large, on the type of installation to be conditioned, and the number of induction units connected to the main refrigerating source.

Referring to FIGURE 6, upper surface of nozzle plate 23 is provided at one edge adjacent nozzle 18, with a drain pan 62 supported thereon and adapted to receive condensate falling from the surface of heat exchanger 13.

Sides 14, 15 and 16, are formed to define a substantially rectangular discharge opening and are provided with horizontal anchor tabs at the lower edge side to engage end covers 26 and 27. While not presently shown, said upper rectangular opening may be provided with a grill, or vaned opening for directing mixed air from the mixing chamber 17 into the room to be conditioned.

Heat exchanger 13 includes a heat exchange coil having liquid inlet and outlet means. Following standard construction, the heat exchange coil may be provided with a plurality of fins or other heat conductive members defining a surface for contacting inflowing secondary air. A back turned lip 67 at each end of the heat exchanger body is spaced to engage the respective out-turned lateral tabs 66 formed on the baffle member, when the latter is in place.

Heat exchanger 13 as shown in FIGURES 1 and 6, when in assembled position and supported against baffle walls 14 and 15, extends substantially the length of the induction unit casing and defines the air inlet for secondary air drawn from the room to be conditioned into mixing chamber 17.

Referring to FIGURE 6, opposed ends of casing 11 are provided with end plate, 26 and 27 so formed and inwardly contoured to engage respective ends of associated members for holding the entire unit into a complete fixed assembly.

Referring to FIGURES 2, 3, 4 and 6, each end cover for example 26, is formed of a substantially rectangular plate 40 having an upturned edge 44 extending circumferentially thereabout. Means forming a flange 43 extends through plate 40, protruding from the outer surface thereof and defining opening 9 for receiving a conditioned air conduit. Flange 43 and upturned edge 44 define therebetween, a channel 50 adapted to receive one end of assembled casing 11 and nozzle plate 23.

Referring to FIGURES 2, 4 and 6, the relative positions of the upstanding edges 44, together with the lower edge of inwardly extending flange 43, define a generally accurate channel into which the lower end of casing 11 registers. Holes 46 and 47 in plate 50, are disposed in alignment with corresponding openings in the casing such as at the track 25 and 25' respectively and at the respective longitudinally extending beads 19 and 20 in the lower part of the casing inner wall.

Screw receiving openings as shown in FIGURE 5, are formed during the extrusion step with an open longitudinal slot. Thus, as a fastening member, such as a self tapping screw is threadably driven into the undersized opening, the screw will firmly lodge itself to hold the end cover in place.

As shown in FIGURES 3, 4 and 6, end cover 26 also includes on the inner face, a first elongated channel 47 extending transversely of plate 40, defined by parallel protruding ridges 48 and 49. Valve assembly 24 including plate 37, is snugly received in channel 47 to longitudinally position said valve plate against movement thereof within the casing 11 when the respective end covers are anchored to the casing.

A support rib 51 carried on the inner face of plate 40 extends substantially parallel to channel 47 being spaced adjacent ledge 59. Rib 51 slideably receives the end of nozzle plate 23 against ledge to vertically locate said plate with respect to the casing. To form an air tight seal, and to avoid leakage of air from plenum 12 to the atmosphere, suitable gasketing means may be carried about opposed ends of nozzle plate 23 and compressed between the surfaces of rib 51 and ledge 59. Rib 51 functions primarily as a vertical support member and can be replaced by a plurality of pins or similar protruding members so positioned to support the edge of the nozzle plate 23 when end cover 26 is fastened into position.

Channel 50 formed intermediate edges 44 and flange 43 is sufficiently wide to closely receive and hold the end surface of casing 11 including a layer of fiberglass 52 disposed about the casing inner wall.

Referring to FIGURE 4, lateral tabs 53 carried at the inner edge of flange 44 are provided with downwardly tapered upper surface to engage a wall of casing 11 and guide the latter to a proper seating position within channel 50.

*Assembly of the unit*

The inner surface of casing 11 as noted above is provided with a layer 52 of fiberglass or other suitable sound absorbing material which is wedged or otherwise held in place. Cover 27 is fastened to one end of casing 11 by self-tapping screws 74 inserted into openings therefore, and threaded into the longitudinally extending casing bores. Thus, one end of the casing 11 is in tight abutting relation with the end cover 26.

Valve assembly 24 comprising lower stationary valve plate 37 and upper slidable valve plate 36 are slideably inserted at the open end of the casing into horizontal channel 31 formed in tracks 25 and 25'.

As shown in FIGURE 6, upper and lower plates 36 and 37 fit readily within the width of the opening defined by the walls of channel 31, and are loosely received therein to permit a restrained movement of plate 36 with respect to lower plate 37. The latter is of a length sufficiently longer than upper plate 36 to permit sliding movement therebetween for adjusting primary air passages defined by corresponding openings in each plate.

The sound attenuating portion of the unit is formed by assembling resilient layers 54, 55, 56, and 57 within nozzle plate 23 in such manner to dispose corresponding openings therein in vertical alignment to define individual attenuating passages 42' terminating at the constricted opening of each nozzle 18. The assembled nozzle plate 35 is downwardly depressed against valve assembly 24 to slightly compress the resilient layers 54, 55, 56 and 57. The entire section is then slid longitudinally into end cover 26 such that the edge of plate 23 registers in groove 58.

To properly align casing 11 within the respective end plates 26 and 27, each of said plates includes ledge 59 disposed at the upper edge thereof. The lower surface of ledge 59 is so spaced from rib 51 to engage firmly supported in tracks 25 and 25'. Groove 28 may be provided with a compressible gasketing or sealant material layer to form a substantially air tight seal with seating nozzle plate edges, however this is not an essential feature.

With the respective ends of casing 11, nozzle plate 23, and valve assembly 24 positioned, end plate 27 is applied to the opposite end of the assembly in the following manner. The lower edge of casing 11 is registered with the lower surface of channel 50 in end plate 27, the latter being tilted slightly downward at the top. End plate 27 is then pivoted into engagement with casing 11 by depressing the nozzle plate assembly 23 sufficiently for the upper edge of the latter to register in the corresponding upper elongated channel 58. Consequently, the edge of plate 37 will be received in chanel 47. Fastening screws are then inserted in the respective openings such that end plate 27 is fixed to the casing. This completes assembly of the lower part of the unit.

As shown in FIGURES 1 and 6, drain pan 61 having an upper edge and an elongated depressed trough 62, is held at the upper side of nozzle plate 23 adjacent nozzle 18. The baffle member formed of connected walls 14, 15, and 16 is then assembled to the respective end plates 26 and 27 by insertion of lower inturned tabs 63 into corresponding grooves 60 formed at ledge 59 at the outer face of end plates 26 and 27. Thereafter heat exchanger 13 is slid downwardly into place in such manner that vertical lips 66 and 67 are in locking engagement. Heat exchanger 13 thus rests on the upper edge of nozzle plate 23 with drain pan 61 retained therebetween, thereby maintaining the drain pan 61 in a substantially firm position.

The completely assembled unit is now ready for installation by connecting to primary air conduits and heat transfer liquid in an air conditioning system. To properly adapt the unit in the system, the procedure for balancing includes adjusting the primary air flow. Thus, with pressurized primary air in plenum 12, valve plate 36 is displaced by rotating actuating member 38 until the desired valve setting is achieved.

It is clear from the foregoing description that the present invention provides not only a quiet, efficient induction unit but also greatly minimizes fabrication and assembly costs.

It is understood by those skilled in the art, that the above description represents a preferred embodiment of the invention and that various changes or modifications may be made in the structure thereof without departing from the spirit and the scope of the invention.

What is claimed is:

1. An induction unit for an air conditioning system having a source of pressurized conditioned air comprising:

a casing forming a plenum having an inlet connected to the supply of conditioned air;

the casing having a first section and a second section;

one of the sections having groove means formed therein to receive the other section therein;

a pair of end covers disposed to engage the first and second sections and prevent disengagement of said sections from each other;

nozzle means formed in one of the sections through which the conditioned air is discharged;

a mixing chamber formed in the induction unit in communication with a second source of air and to receive the conditioned air from the nozzle means for mixing with air from the second source prior to its discharge from the induction unit;

a wall means extending from the casing to define the mixing chamber, the end cover engaging the wall means to maintain its assembled position;

a receiving means formed on the wall means;

a heat exchanger, through which air from the second source passes into the mixing chamber, slidably engaged with the receiving means formed on the wall means; and a drain pan disposed below the heat exchanger and having an outwardly extending trough to receive condensate dripping from the heat exchanger, the drain pan held in operative position by engagement with the heat exchanger.

2. An air handling unit for an air conditioning system comprising;

an elongated frame having a substantially U shaped cross section with spaced side walls defining an opening along the longitudinal line of the frame;

track means on each of the side walls adjacent to the longitudinal opening of the frame, each of the track means having at least two longitudinal grooves therein;

a first sheet member having edges which engage the outside grooves in the tracks so as to form a single chambered plenum with the frame, and having a nozzle thereon for discharging air;

an attenuating section within the plenum including a perforated second sheet member having edges which engage the inside grooves in the tracks and attenuating substances between the first and second sheet members to dampen noise causing frequencies in the air flow to the nozzles;

a pair of end covers attached to the ends of the frame, the covers having means for holding the edges of the sheet members in the grooves; and at least one end cover having an opening to receive conditioned air from the system to which the air handling unit is connected.

3. An air handling unit as defined in claim 2 wherein the frame is an extruded member.

4. An air handling unit as defined in claim 3 including an additional longitudinal groove in each track means for holding the edges of a sheet of sound absorbing material placed along the inside surface of the substantially U-shaped frame.

5. The air handling unit as defined in claim 2 including a valve for controlling the flow of air through the nozzles, the valve comprising a perforated third sheet member adjacent the perforated second sheet member, the perforated third sheet member being slidably mounted so as to allow a varying degree of overlap between the perforations of the perforated sheet members.

6. The air handling unit as defined in claim 5 wherein the nozzles direct the air in a generally upward direction into a mixing chamber for inducing a flow of air from a secondary source into the mixing chamber, the mixing chamber comprising;

wall means extending upward from the plenum casing to form three sides of the generally rectangular mixing chamber, the parallel sides of the wall means having inwardly projecting horizontal tongues engaging cooperating grooves in the end covers to prevent movement of the wall means in a vertical direction;

a heat exchanger attached to the opposite side of said wall means to form the fourth side of the mixing chamber, the heat exchanger and wall means having cooperating vertical tongue and grooves connecting means, said heat exchanger allowing the induction of a flow of air from the secondary source through the heat exchanger and into the mixing chamber by the action of air passing through the nozzles; and means for preventing horizontal movement of the heat exchanger with respect to the casing, whereby the wall means, heat exchanger, and casing will form an interlocked unit.

References Cited by the Examiner
UNITED STATES PATENTS

| | | | |
|---|---|---|---|
| 2,814,242 | 11/1957 | Marini et al. | 98—40 |
| 2,993,488 | 7/1961 | Stec | 137—625.33 X |
| 3,186,327 | 6/1965 | Giurlando et al. | 98—38 |
| 3,194,145 | 7/1965 | Robertson | 98—40 |
| 3,211,218 | 10/1965 | Mehr et al. | 98—38 X |

ROBERT A. O'LEARY, *Primary Examiner.*

W. E. WAYNER, *Assistant Examiner.*